March 27, 1951     J. BAUER ET AL     2,546,882
DEPTH GAUGE
Filed Aug. 28, 1947
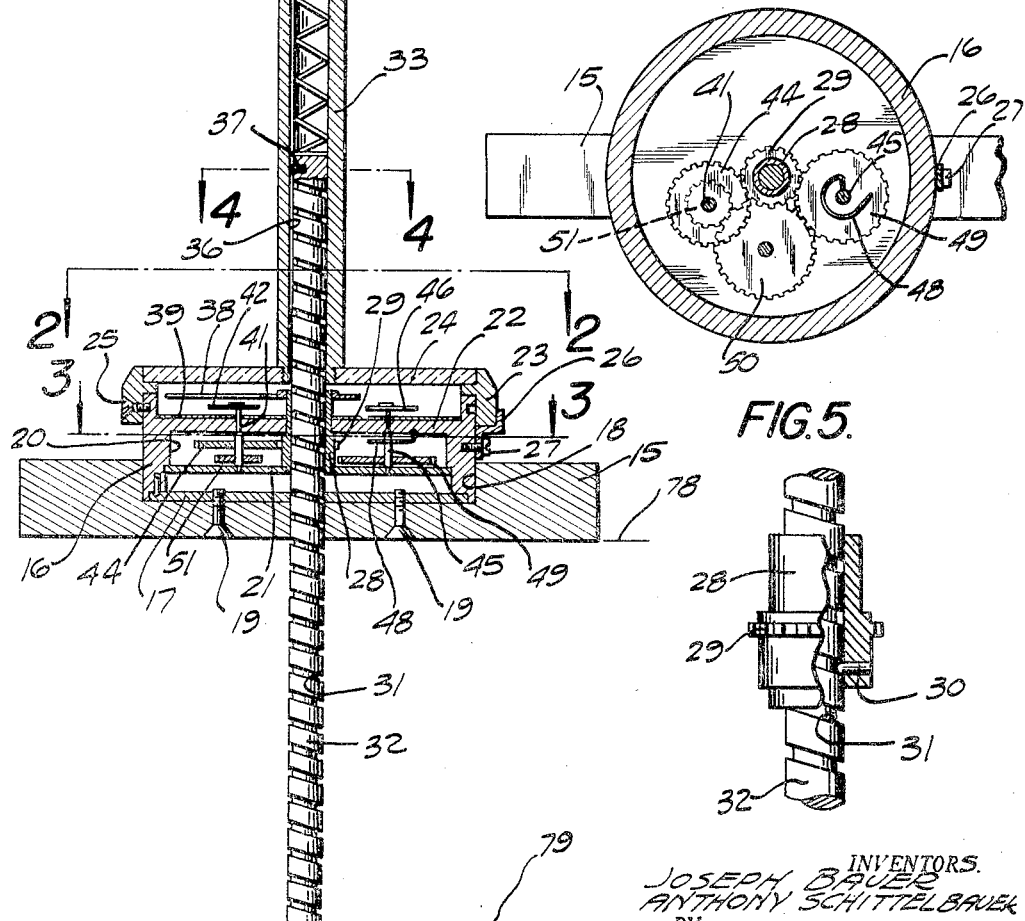
INVENTORS.
JOSEPH BAUER
ANTHONY SCHITTELBAUER
BY
ATTORNEY.

Patented Mar. 27, 1951

2,546,882

UNITED STATES PATENT OFFICE 2,546,882

DEPTH GAUGE

Joseph Bauer and Anthony Schittelbauer,
Detroit, Mich.

Application August 28, 1947, Serial No. 771,082

6 Claims. (Cl. 33—172)

1

Our invention relates to a new and useful improvement in a depth gauge and while the drawing illustrates the invention as applied to a depth gauge and used for measuring depth, it will also appear that the same invention using the same principle functioning in the same manner can also be used on fixture gauges or as a "C" type gauge.

It is an object of the present invention to provide a gauge of this class which will be simple in structure, economical of manufacture, durable, compact, light, highly efficient in use, and accurate.

Another object of the invention is the provision of a gauge of this class having a reciprocating shaft provided with a spiral groove in which engages a pin for rotating the indicating mechanism.

Another object of the invention is the provision in a gauge of this class of means whereby the gauge may be easily and quickly adjusted so that accuracy may be obtained at all times.

Other objects will appear hereinafter.

It is recognized that various modifications and changes may be made in the detail of structure illustrated without departing from the invention and it is intended that such shall be embraced within the scope of the claims which form a part hereof.

Forming a part of this specification are drawings in which,

Fig. 1 is a longitudinal, central, sectional view of the invention,

Fig. 2 is a view taken on line 2—2 of Fig. 1,

Fig. 3 is a sectional view taken on line 3—3 of Fig. 1,

Fig. 4 is a sectional view taken on line 4—4 of Fig. 1,

Fig. 5 is a fragmentary, side elevational view with parts broken away and parts shown in section illustrating the sleeve used in the invention.

As shown in the drawings, the invention comprises a base or block 15 which may be termed a work contacting piece. A housing 16 having a bottom 17 is positioned in a recess 18 formed in the base or contact piece 15 and secured thereto by means of screws 19 which are threaded into the bottom 17. This housing is provided with the compartment 20 extended across which is the partition 21 and which is closed at its upper end by the partition 22. Embracing the upper end of this housing is a ring 23 in which is fixedly mounted a transparent closure 24. This ring 23 is secured in fixed relation to the housing by means of the screw 25 and the clamp 26 which is held in position by the screw 27 threaded into the wall of the housing. Extended through the partition 22 and journaled at its lower end in an opening in the partition 21 is a sleeve 28 on the periphery of which is a gear 29 rotating in unison therewith. This sleeve 28 carries the inwardly projecting pin 30 which is adapted to engage in the spiral groove 31 formed in the contact stem 32 which is adapted to reciprocate in the tube 33. This tube 33 is secured at its lower end fixedly to the closure 24 and is provided at its upper end with the cap or plug 34 against which engages one end of the coil spring 35, the other end of which engages the end of the stem 32. Formed on the inner surface of the tube 33 and extending longitudinally thereof is a groove 36 in which engages a pin 37 carried by and projecting outwardly beyond the periphery of the stem 32 so that relative rotation between the stem 32 and the tube 33 cannot take place but as the stem 32 is moved longitudinally relatively to the sleeve 28, the sleeve 28 will be caused to rotate through the engagement of the pin 30 in the spiral groove 31.

Carried by the upper end of the sleeve 28 and projecting outwardly therefrom is a pointer 38 which is adapted to indicate on the graduations 40 which are formed on the dial plate 39, the degree of rotation of the sleeve 28 and thus the longitudinal movement of the stem 32.

Projected through the partition 22 and the dial plate 39 and journaled at its lower end in the partition 21 is a shaft 41 on which is fixedly mounted a pointer 42 adapted to co-operate with the graduations 43 displayed on the dial plate 39 and which, of course, would be visible through the transparent closure 24. Fixedly mounted on this shaft 41 is a gear 44 which meshes with the gear 29 but which is of larger diameter than the gear 29.

Projecting through the partition 22 and the dial plate 39 and journaled at its lower end in the partition 21 is a shaft 45 on which is fixedly mounted a pointer 46 co-operating with the graduations 47 displayed on the dial plate 39. A hair spring 48 is connected at one end to the shaft 45 and at the opposite end to the partition 22 so as to prevent back-lash of the device when it is being operated. Fixedly mounted on the shaft 45 is a gear 49 which meshes with an idler gear 50 which is in mesh with the smaller gear 51 fixedly mounted on the shaft 41. The construction is such that as the stem 32 is moved longitudinally or axially of the sleeve 28, all of the gears will be rotated so that all of the pointers 38, 42 and 46 will rotate.

The graduations 40, with which the pointer 38 co-operates, each represent one one-thousandths of an inch so that when the pointer 38 moves the distance between one of these graduations, the indication would be that the longitudinal axial movement of the stem 32 would be one-thousandths of an inch. It will be noted that there are two hundred of these graduations 40 so that a complete rotation of the pointer 38 would indicate longitudinal movement of the stem 32 of two-hundred-thousandths of an inch or two tenths of an inch. The ratio is a five to one ratio so that for each rotation of the pointer 38, the pointer 42 will move two of the graduations so that each of the graduations 43 indicate the longitudinal movement of the stem 32 of one-tenth of an inch. The ratio between the gearing 51 and the gearing 49 is such that for each complete rotation of the pointer 42, a pointer 46 will move a distance indicated by one of the graduations 47 so that the graduations on the scale 47 represent a longitudinal movement of the stem 32 of one inch.

In using the device, the adjustment would be made so that when the stem 32 is thrust flush with the bottom surface of the contact piece 15, the scales would be at zero. This adjustment may be made by loosening the screw 27 and rotating the ring 23 which will carry with it the closure 24 and cause the tube 33 to rotate. This will effect a rotation and a longitudinal movement of the stem 32 without rotating the sleeve 28 so that the mechanism may be adjusted to a proper accuracy and zero point. In use, the end of the stem 32 would be engaged in the depth which it is desired to measure and the contact member 15 moved downwardly until it touches the top of the work-piece. The line 78 may represent the top of the work-piece and the line 79 the bottom of the recess which it is desired to measure. As this movement of the member 15 downwardly to engage the top of the work-piece is effected, the tube 33 will travel longitudinally of the stem 32 as will also the sleeve 28 and the pin 39 will cause a rotation of the sleeve 28 in proportion to the amount of longitudinal movement of the sleeve 28 relatively to the stem 32, thus causing a rotation of the pointers to indicate the amount of distance that the stem 32 has traveled longitudinally upwardly in the sleeve 33.

Experience has shown that a gauge of this type is one which may be easily and quickly operated, which is compact, light, easily and quickly adjusted, and highly efficient in use.

What we claim as new is:

1. A gauge of the class described, comprising: a contact piece adapted for contacting a work-piece; an indicating mechanism mounted on said contact piece, said contact piece and said indicating mechanism having aligning passages formed therethrough; a stem slidably projected through said passages and adapted for contacting at one end a work-piece, said stem having a spiral groove formed thereon; a sleeve in said indicating mechanism and embracing said stem and rotatable thereon and in fixed axial relation to said contact piece; a pin carried by said sleeve and engaging in said groove and adapted for rotating said stem relatively thereto; and a gear mounted on and embracing said sleeve and rotatable in unison therewith for actuating said indicating mechanism for indicating the amount of movement longitudinally of said stem relatively to said sleeve.

2. A gauge of the class described, comprising: a contact piece adapted for contacting a work-piece; an indicating mechanism mounted on said contact piece, said contact piece and said indicating mechanism having aligning passages formed therethrough; a stem slidably projected through said passages and adapted for contacting at one end a work-piece, said stem having a spiral groove formed thereon; a sleeve in said indicating mechanism and embracing said stem and rotatable thereon and in fixed axial relation to said contact piece; a pin carried by said sleeve and engaging in said groove and adapted for rotating said sleeve upon longitudinal movement of said stem relatively thereto; and a gear mounted on and embracing said sleeve and rotatable in unison therewith for actuating said indicating mechanism for indicating the amount of movement longitudinally of said stem relatively to said sleeve; a guide tube projecting outwardly from said indicating mechanism, said stem being slidably projected in said guide tube; and resilient means in said guide tube and engaging at one end with the end of said stem for normally resisting slidable movement of said stem relatively thereto in one direction.

3. A gauge of the class described, comprising: a contact piece adapted for contacting a work-piece; an indicating mechanism mounted on said contact piece, said contact piece and said indicating mechanism having aligning passages formed therethrough; a stem slidably projected through said passages and adapted for contacting at one end a work-piece, said stem having a spiral groove formed thereon; a sleeve in said indicating mechanism and embracing said stem; a pin carried by said sleeve and engaging in said groove and adapted for rotating said sleeve upon longitudinal movement of said stem relatively thereto; and a gear mounted on the periphery of said sleeve and rotatable in unison therewith for actuating said indicating mechanism for indicating the amount of movement longitudinally of said stem relatively to said sleeve; a guide tube projecting outwardly from said indicating mechanism, said stem being slidably projected in said guide tube; and resilient means in said guide tube and engaging at one end with the end of said stem for normally resisting slidable movement of said stem relatively thereto in one direction; and means co-operating with said tube and said stem for preventing relative rotation of said sleeve and said stem.

4. A gauge of the class described, comprising: a contact piece; a housing mounted on said contact piece; indicating mechanism mounted in said housing; a transparent closure for said housing; a retaining ring for said closure, said retaining ring being rotatable concentrically around said housing; means for securing said ring in fixed relation to said housing; a sleeve in said housing; a contact stem slidably projecting through said contact piece, said housing, said sleeve and said closure and having on its periphery a spiral groove; a gear fixedly mounted on the periphery of said sleeve for actuating said indicating mechanism upon rotation of said sleeve; and a pin mounted on said sleeve and engaging in said groove for effecting a rotation of said sleeve upon slidable movement of said contact stem therethrough.

5. A gauge of the class described, comprising: a contact piece; a housing mounted on said contact piece; indicating mechanism mounted in said housing; a transparent closure for said housing; a retaining ring for said closure, said retaining ring being rotatable concentrically around said housing; means for securing said ring in fixed relation to said housing; a sleeve in said housing; a contact stem slidably projecting through said contact piece, said housing, said sleeve and said closure and having on its periphery a spiral groove; a gear mounted on the periphery of said sleeve for actuating said indicating mechanism upon rotation of said sleeve; a pin on said sleeve and engaging in said groove for effecting rotation of said sleeve upon slidable movement of said contact stem therethrough; a guide tube carried by and projecting upwardly from said closure, one end of said contact stem projecting into said guide tube; and means for preventing relative rotation of said guide tube and said contact stem.

6. A gauge of the class described, comprising: a contact piece; a housing mounted on said contact piece; indicating mechanism mounted in said housing; a transparent closure for said housing; a retaining ring for said closure, said retaining ring being rotatable concentrically around said housing; means for securing said ring in fixed relation to said housing; a sleeve in said housing; a contact stem slidably projecting through said contact piece, said housing, said sleeve and said closure and having a spiral groove on its periphery; a gear fixed on the periphery of said sleeve for actuating said indicating mechanism upon rotation of said sleeve; a pin mounted on said sleeve and engaging in said groove for effecting a rotation of said sleeve upon slidable movement of said contact stem therethrough; a guide tube carried by and projecting upwardly from said closure, one end of said contact stem projecting into said guide tube; means for preventing relative rotation of said guide tube and said stem; and resilient means in said guide tube and engaging at one end with the end of said contact stem for resisting slidable movement of said contact stem into said guide tube in one direction.

JOSEPH BAUER.
ANTHONY SCHITTELBAUER, JR.

REFERENCES CITED

The following references are of record in the file of this patent:

UNITED STATES PATENTS

| Number | Name | Date |
|---|---|---|
| 1,235,785 | Fishel | Aug. 7, 1917 |
| 1,415,120 | Rooney | May 9, 1922 |
| 1,419,306 | Reisner | June 13, 1922 |
| 1,927,326 | Walker | Sept. 19, 1933 |
| 2,212,306 | Schwartz | Aug. 20, 1940 |
| 2,213,026 | Hoffman | Aug. 27, 1940 |
| 2,303,858 | Ostberg | Dec. 1, 1942 |
| 2,437,639 | Floyd | Mar. 9, 1948 |

FOREIGN PATENTS

| Number | Country | Date |
|---|---|---|
| 510,000 | Great Britain | July 25, 1939 |